Aug. 3, 1965    H. E. LUND    3,198,548
TRUCK TRACTOR-TRAILER COUPLING
Filed Dec. 5, 1962
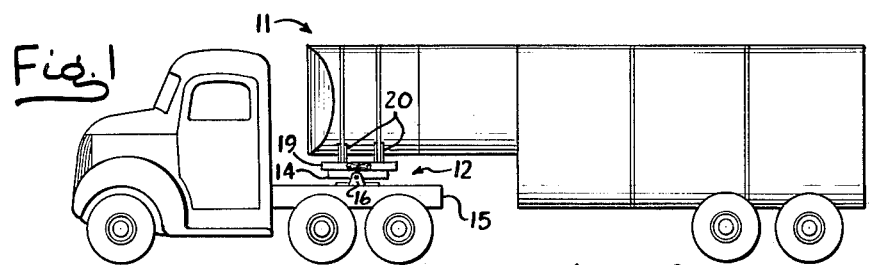
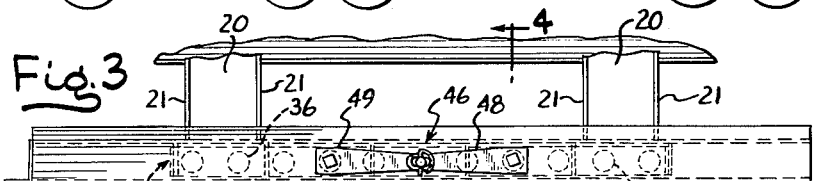
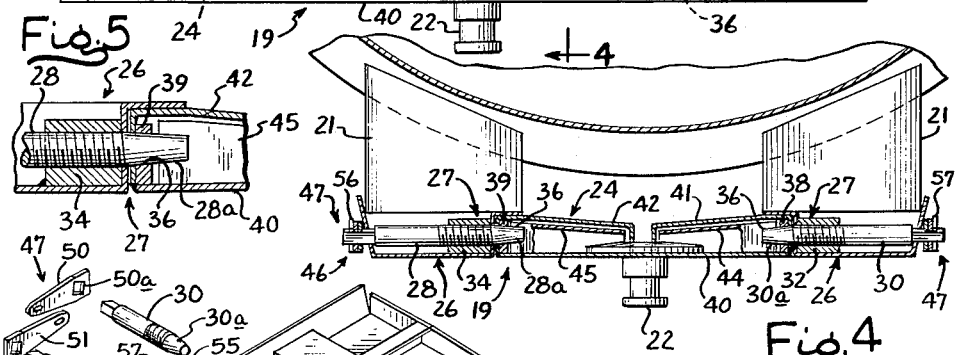
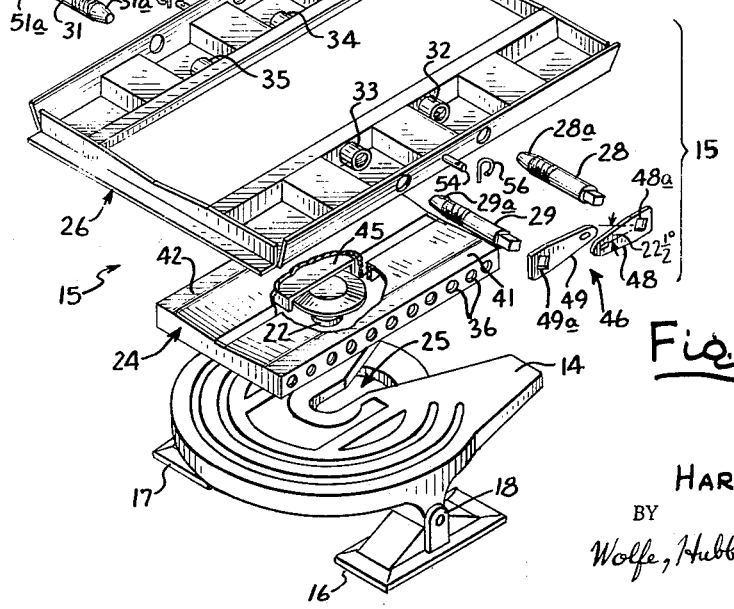
INVENTOR.
HAROLD E. LUND
BY
Wolfe, Hubbard, Voit & Osann
ATTYS.

United States Patent Office 3,198,548
Patented Aug. 3, 1965

3,198,548
TRUCK TRACTOR-TRAILER COUPLING
Harold E. Lund, Oregon, Ill., assignor to E. D. Etnyre &
Co., Oregon, Ill., a corporation of Illinois
Filed Dec. 5, 1962, Ser. No. 242,414
4 Claims. (Cl. 280—407)

The present invention relates to truck tractor-trailer couplings and more particularly to a new and improved structure for adjusting the relative positions of the tractor and trailer.

In order to adjust the load-per-axle to meet the strictly enforced load limits on present day highways, it has been proposed to provide means for adjusting the position of the trailer relative to the tractor. For example, by moving the trailer forward, a larger portion of the trailer load can be supported upon the tractor axle. The adjusting structure for this purpose must be inherently strong to withstand the heavy wear to which tractor-trailer couplings are subjected. The prior art structures have utilized bolts inserted through registering openings; however, among other problems, the openings enlarge with use and it is no longer possible to lock the trailer securely in position thereby creating a dangerous driving condition. Furthermore, the prior art structures are cumbersome and unreliable. It is necessary to use several tools and expend substantial time and effort in removing bolts especially when they rust.

Accordingly, it is an object of the present invention to provide a truck tractor-trailer coupling having simply operable means for selectably adjusting the relative position of the trailer to the truck tractor. Along these lines, it is an object to provide a reliable adjusting structure which can withstand the rugged use to which tractor-trailer couplings are subjected while still maintaining the tractor-trailer coupling tightly locked. Also, it is an object to provide means to assure that the adjusting structure does not accidentally unlock.

It is a more specific object of the present invention to provide a tractor-trailer coupling with a large number of positions from which a selection can be made of the particularly desirable coupled position of the tractor and trailer. It is an object to provide an adjusting structure which is easily adjusted even after rusting with use.

It is an overall object of the present invention to provide an economically manufacturable, simple and easily adaptable tractor-trailer coupling which has a long life.

Other objects and advantages of the invention will become apparent upon reading the following detailed description and upon reference to the drawings in which:

FIGURE 1 is an elevation of a truck employing a tractor-trailer coupling constructed in accordance with the present invention;

FIG. 2 is an exploded view of the tractor-trailer coupling constructed in accordance with the present invention;

FIG. 3 is a side elevation of the portion of the tractor-trailer coupling carried on the front part of the trailer;

FIG. 4 is a section of the trailer portion of the tractor-trailer coupling as taken along parallel offset planes 4—4 as shown in FIG. 3, and FIG. 5 is an enlarged section of a portion of the locking structure shown in FIG. 4.

While the invention will be described in connection with a preferred embodiment, it will be understood that I do not intend to limit the invention to such embodiment but on the contrary, I intend to cover all alternatives, modifications and equivalents as may be included within the spirit and scope of the invention as defined by the appended claims.

Turning to the drawings, there shown in FIG. 1 is a truck tractor-trailer 11 provided with a coupling 12 embodying the present invention. The coupling includes a lower fifth wheel 14 carried on the tractor platform 15 in a pair of anchor members 16, 17. To facilitate both initial coupling of the tractor to the trailer and improving maneuverability during use, the lower fifth wheel is pivotably carried in the anchor members 16, 17, one pivot connection being shown at 18. A mating upper fifth wheel 19 is mounted to the front of the trailer by a plurality of legs 20 and supporting gussets 21.

To connect the tractor and trailer together so that the trailer can be drawn by, yet pivoted relative to, the tractor for easy maneuverability, a kingpin 22 is carried in the upper fifth wheel 19 by a kingpin carrier assembly 24. Coupling of the trailer to the tractor is accomplished by driving the tractor in reverse so as to slide the tractor lower fifth wheel 14 beneath the trailer upper fifth wheel 19 until the kingpin 22 registers in a slot 25 in the lower fifth wheel and catches in a releasable catching mechanism (not shown). The mechanism retains the kingpin 22 while allowing it to rotate so that the lower fifth wheel 14 can rotate in respect of the upper fifth wheel 19. As is clear, this provides a breaking joint between the tractor and trailer for easy maneuvering of the truck.

In accordance with the present invention the upper fifth wheel 19 has the kingpin carrier assembly 24 selectably slidable relative to an upper fifth wheel frame 26 to adjust the position of the trailer in respect of the tractor with a locking structure 27 provided to lock the carrier assembly with the frame. In the present instance, as shown in FIG. 2, the locking structure includes four locking pins 28, 29 and 30, 31 threadably received in respective tapped collars 32, 33 and 34, 35 anchored in the frame 26. The locking of the frame 26 and the kingpin carrier assembly 24 is accomplished by screwing the locking pins until the respective tapered ends 28a, 29a and 30a, 31a seat in the selected ones of a plurality of registering conical shaped openings 36 in the respective longitudinal sides of carrier assembly 24. Providing tapered ends on the pins and conical openings for receiving these pin ends is advantageous for at least two reasons. First, it is not necessary to bring the carrier assembly 24 and frame 26 into exact alignment to lock them together. If there is not an exact register, the wedging action as the pins are tightened will draw the kingpin carrier 24 into alignment with the frame 26. Additionally, as the tractor-trailer coupling 12 is used, the openings 36 in the kingpin carrier 24 enlarge with wear. To maintain a tight locked connection between the carrier and frame, it is simply necessary to tighten the pins so the respective tapered ends 28a, 29a and 30a, 31a enter further into the enlarged tapered openings 36.

To provide the necessary bearing surface for engaging the tapered ends of the respective pins, in the present instance bars 38, 39 are mounted along the respective longitudinal sides of the kingpin carrier assembly 24. The conical openings 36 extend into the bar stock.

The kingpin carrier assembly includes a frame particularly adapted to transmit the large forces from the kingpin to the locking pins and thereby the trailer without deforming the kingpin carrier assembly. In this particular embodiment, as best shown in FIGS. 2 and 4, the frame includes a bottom plate 40 to which the upper end of the kingpin 22 is fastened preferably by welding. The plate 40 rests on the flat surface of the lower fifth wheel when the tractor and trailer are coupled. Fastened atop the plate are a pair of longitudinal channel members 41, 42, which also form the respective longitudinal sides of the kingpin carrier assembly 24 (see FIG. 2). Transverse to these channel members 41, 42 and enclosed therein are a pair of crosswise channel members 44, 45. The kingpin is fastened to both sets of channel members in the present instance by welding. The preferred embodiment discloses one way of assuring that forces applied to the kingpin 22 are transmitted to the locking structure 27 without deforming the upper fifth wheel 19. Accordingly, even if heavy loads are applied to the kingpin, the kingpin carrier 24 and stationary frame 26 will maintain their shape so that sliding adjustment of these two parts can always be accomplished.

For allowing selection of several positions at which the kingpin carrier assembly 24 can be locked, there is provided a plurality of spaced conical openings 36, in the present instance eleven. The locking pins are so spaced in the present instance that the kingpin carrier assembly 24 can be locked at seven different positions relative to the frame 26. It is within the teachings of the present invention to have more or less openings 36 and also to use different spacings between the locking pins making the present invention adaptable to a variety of truck requirements.

As another aspect of the present invention, a pair of non-backout locking assemblies 46 and 47 are provided for maintaining the locking pins 28, 29 and 30, 31, respectively, engaged with the kingpin carrier assembly 24. In the present instance, the locking assemblies include two pairs of locking arms 48, 49 and 50, 51 on each longitudinal side of the carrier assembly 24. For non-rotatably receiving the respective outside ends of the locking pins, as shown in FIG. 3, the preferred construction of the arms include rectangular openings 48a, 49a and 50a, 51a, respectively. When installed in place each pair of arms is held against rotation by pins 54, 55, one of the pins anchored in each of the respective longitudinal sides of the frame 26. One end of each of the arms 48, 49 has an opening to receive the pin 54 and one end of each of the other arms 50, 51 also has an opening to receive the other pin 55. Pull pins 56, 57, respectively hold the arms on the pins after the arms are installed thereon.

To provide a plurality of angular positions at which the locking pins 28, 29, 30, 31 can be held against backing out, as shown in FIG. 2, the preferred embodiment of the rectangular openings 48a, 49a, 50a and 51a in the arms do not have their respective sides either perpendicular or parallel to the axis of the arms. Instead, the openings are angularly offset to the arm axis by approximately 22½ degrees. Accordingly, in the present instance, by providing a square opening to fit onto a square locking pin end and by selectively flipping the arms about their respective axis, each locking pin 28, 29, 30, 31 can be held in any of eight different angular positions.

As is clear from the foregoing description, the tractor-trailer coupling 12 provides a large number of selectable positions for locking the trailer relative to the tractor. To select a new position, the driver need only to remove the pull pins 56, 57 and slip the arms 48, 49, 50, 51 from the respective locking pins. Next, the easily accessible heads of the locking pins 28, 29, 30, 31 can be backed out of the kingpin carrier openings 36 using a simple wrench. With the locking pins backed out, the tractor can be driven either forward reverse moving the kingpin carried 24 therewith until the trailer, which remains stationary, takes a new position relative to the truck tractor. The tractor-trailer coupling 12 is locked in the new position by the simply operated locking structure 27. As has been explained, locking is accomplished by turning the locking pins until they seat tightly in the openings 36. Thereupon, the non-backout locking assemblies 46, 47 are installed to lock the pins 28, 29, 30, 31 against backing out of carrier openings 36.

I claim as my invention:

1. In a truck tractor-trailer coupling, the combination comprising, a lower fifth wheel mounted at the rear of the tractor, and an upper fifth wheel assembly mounted on the trailer, said assembly having a kingpin mounted in a kingpin carrier engageable with said lower fifth wheel to couple said tractor and trailer, said upper fifth wheel assembly including a stationary frame with said kingpin carrier mounted therein for sliding movement relative to said frame, said stationary frame and said kingpin carrier being locked together by a plurality of threaded pins having tapered ends, said pins being threadably engaged in a set of tapped openings in said stationary frame, each of said pin tapered ends registering with a selected one of a plurality of tapered openings in said kingpin carrier to lock in position the trailer relative to the tractor.

2. In a truck tractor-trailer coupling, the combination comprising, a lower fifth wheel mounted at the rear of the tractor, an upper fifth wheel assembly mounted on the trailer, said assembly having a kingpin mounted in a kingpin carrier engageable with said lower fifth wheel to couple said tractor and trailer, said upper fifth wheel assembly including a stationary frame with said kingpin carrier mounted therein for sliding movement relative to said frame, said stationary frame and said kingpin carrier being locked together by a plurality of threaded pins with tapered ends, said pins being threadably engaged in a set of tapped openings in said frame, each of said pin tapered ends registering with a selected one of a plurality of tapered openings in said kingpin carrier to lock in position the trailer relative to the tractor, and means carried on said stationary frame for securing said pins against backing out of said carrier tapered openings.

3. In a truck tractor-trailer coupling, the combination comprising, a lower fifth wheel mounted at the rear of the tractor, and an upper fifth wheel assembly mounted on the trailer, said assembly having a kingpin mounted in a kingpin carrier engageable with said lower fifth wheel to couple said tractor and trailer, said upper fifth wheel assembly including a stationary frame with said kingpin carrier mounted therein for sliding movement relative to said frame, said stationary frame and said kingpin carrier being locked together by a plurality of threaded pins, said pins being threadably engaged in a set of tapped collars in said stationary frame, each of said pins having one end registering with a selected one of a plurality of openings in said kingpin carrier to lock in position the trailer relative to the tractor, and the opposite end of each of said pins held by a locking arm selectively anchored to said stationary frame, said locking arm removable for selective unlocking and backing-out of said pin and installable for locking said pin in fixed angular positions.

4. In a truck tractor-trailer coupling, the combination comprising, a lower fifth wheel mounted at the rear of the tractor, and an upper fifth wheel assembly mounted on the trailer, said assembly having a kingpin mounted in a kingpin carrier engageable with said lower fifth wheel to couple said tractor and trailer, said carrier being of a substantially non-deformable type including two pair of channel members substantially transverse to each other for transmitting forces applied at the kingpin to the trailer, said upper fifth wheel assembly including a stationary frame with said kingpin carrier mounted therein for sliding movement relative to said frame, said stationary frame and said kingpin carrier being locked together by a plurality of threaded pins with tapered ends, said pins being threadably engaged in a set of tapped openings in said stationary frame, each of said pin tapered ends registering with a selected one of a plurality of tapered openings in said kingpin carrier to lock in position the trailer relative to the tractor.

References Cited by the Examiner

UNITED STATES PATENTS

| | | | |
|---|---|---|---|
| 1,227,855 | 5/17 | Thomas. | |
| 1,725,790 | 8/29 | Halagarda | 151—44 |
| 2,363,006 | 11/44 | Klaus | 151—44 |
| 2,676,815 | 4/54 | Bennett | 280—80 X |
| 2,923,560 | 2/60 | Anderson | 280—407 |
| 2,976,051 | 3/61 | Morey. | |

A. HARRY LEVY, *Primary Examiner.*

LEO FRIAGLIA, *Examiner.*